(12) United States Patent
Sekine (10) Patent No.: US 6,198,692 B1
(45) Date of Patent: Mar. 6, 2001

(54) APPARATUS SUITABLE FOR SEARCHING OBJECTS IN WATER

(75) Inventor: Chogo Sekine, Mitaka (JP)

(73) Assignee: Japan Radio Co., Ltd., Mitaka (JP)

( * ) Notice: Subject to any disclaimer, the term of this patent is extended or adjusted under 35 U.S.C. 154(b) by 0 days.

(21) Appl. No.: 09/263,220

(22) Filed: Mar. 5, 1999

(30) Foreign Application Priority Data

Mar. 31, 1998 (JP) .................................................. 10-086731
Sep. 4, 1998 (JP) .................................................. 10-250584

(51) Int. Cl.⁷ .................................................. G01S 15/96
(52) U.S. Cl. .................................................. 367/11; 367/111
(58) Field of Search .................................................. 367/111, 88, 7, 367/11, 103

(56) References Cited

U.S. PATENT DOCUMENTS

5,134,884  8/1992  Anderson .
5,184,330  2/1993  Adams et al. ........................ 367/111
5,537,380  7/1996  Sprankle, Jr. et al. ............... 367/111
5,540,229  7/1996  Collet-Billon et al. .

*Primary Examiner*—Daniel T. Pihulic
(74) *Attorney, Agent, or Firm*—Oliff & Berridge, PLC (57) ABSTRACT

A fish finder having two 1D transducer arrays vertically arranged on a ship's hull. Each 1D transducer array provides a beam having a narrow width on a plane parallel to a plane in the transducer arrangement direction, and a fan-like beam on a plane crossing the plane. Ultrasonics are transmitted toward and received from the target on the first plane, by using the fan beam of the first 1D transducer array, and received from the second plane perpendicular to the first plane by using the fan beam of the second 1D transducer array. While the beam direction of the first 1D transducer array is gradually changed, that of the second 1D transducer array is rapidly changed so that information concerning the 3D space below the water surface is obtained. The obtained information is subjected to ray tracing processing for 3D displaying of an image on a 2D screen. This arrangement enables quicker detection of fish schools.

21 Claims, 9 Drawing Sheets

Fig. 3A af : VERTICAL LINE
abc : BEAM FORMATION SURFACE OF TRANSDUCER ARRAY 110
 (BEAM TRANSMITTING PLANE)
ade : BEAM FORMATION SURFACE OF TRANSDUCER ARRAY 111
 (BEAM RECEPTION PLANE)
ag : CROSS LINE OF abc AND ade
$\theta, \phi$ : BEAM DIRECTIONS OF TRANSDUCER ARRAYS 110, 111

Fig. 4

PP1, QQ1, ------ RR1 : LINES ON BEAM TRANSMITTING PLANE
TO BE SCANNED BY TRANSDUCER
ARRAY 111 BEAM

APPARATUS SUITABLE FOR SEARCHING OBJECTS IN WATER

BACKGROUND OF THE INVENTION

1. Field of the Invention

The present invention relates to an apparatus suitable for searching an underwater object, and particularly to a fish finder, which transmits ultrasonics from a transducer attached to the bottom of a ship into a body of water, receives reflected ultrasonics from fish schools or the like, converts the received ultrasonics to an electric signal and further to digital data, and displays on a display device, based on the obtained data, an image representative of any schools of fish present and, if present, its concentration and size.

2. Description of the Related Art

Fish finders visually display an image representative of the concentration and size of any school of fish present in an operation area of a fishing boat, and are widely used in such fishing boats and other watercraft. However, conventional fish finders have a fault in that they require a significant time to detect a school of fish. Specifically, for accurate detection and display of the location and size of a school of fish, a transducer with narrow directivity must be used. However, when such a transducer with narrow directivity is used, only a narrow area can be scanned. Therefore, in order to locate fish schools, the ship must move around its operation zone to conduct a close search. This contributes to increased operation hours and, as a consequence, increases labor and fuel costs.

SUMMARY OF THE INVENTION

One object of the present invention is to eliminate the need for inefficient seeking and tracking of objects in water, e.g., schools of fish, such as close searches while moving within an operation zone. This object is achieved in the present invention by performing 3D scanning with respect to a space under the water surface and giving ray tracing to obtained data for 3D displaying on a 2D screen.

A fish finder according to the present invention comprises a scanner, a ray tracer, and a display. The scanner three-dimensionally scans the area beneath the water's surface using directed supersonics, to obtain reception data revealing the presence or absence, concentration, and size of any schools of fish in the water. The data is expressed relative to a 3D polar coordinate system with the ship's hull used as the origin. The ray tracer gives ray tracing processing to the reception data obtained by using the scanner so that an image similar to the image that would be seen when viewing the space from a hypothetical viewing point, is displayed on a display screen. An image representing the presence or absence, concentration, and size of any underwater schools of fish is displayed on the display screen based on the reception data subjected to ray tracing processing. Therefore, according to the present invention, users can obtain that information for a region around their ship without conducting wasteful effort, such as close search while moving the ship around. Further, since the image displayed on the display screen is a 3D image including depth information, advantageously, the user can intuitively understand the size, condition, and other information concerning any displayed fish schools.

A scanner of this invention can be achieved by using, for example, a 2-dimensional (2D) transducer array capable of changing its beam direction two-dimensionally. That is, a 2D transducer array comprising transducers arranged in an array, is fixedly attached to a ship's hull so that each transducer transmits or receives a signal. The transmitted or reception signal is desirably subjected to phase shifting whereby the beam direction can be two-dimensionally changed (e.g., both in the fore/aft direction and in the post/starboard direction). This allows 3D scanning of the area below the water's surface. However, this structure has a problem such that too many transducers (and associated phase shifters) are required, which inevitably increases the size of such a device as a whole.

To avoid this problem, a plurality of 1D transducer arrays are fixedly attached to the ship's hull such that the transducer arrangement directions thereof cross one another. A 1D transducer array mentioned here is a transducer array having a structure in which a plurality of transducers are one-dimensionally arranged in a predetermined direction. As is well known, the beam width of a transducer array on a plane perpendicular to the transducer arrangement direction is the same as that when a transducer is used alone. However, the beam width on a plane perpendicular to that plane, i.e., a plane in parallel to the transducer arrangement direction, is significantly narrower than that when a transducer is used alone.

Therefore, in rendering the present invention into practice, preferably, a first 1D transducer array is arranged such that the transducer arrangement direction thereof (i.e., a direction in which the beam direction is changeable) is parallel to a first plane which crosses the horizontal plane, and such that a second 1D transducer array is arranged such that the transducer arrangement direction thereof is parallel to a second plane which crosses to both the horizontal plane and the first plane. Further, while the first transducer array transmits ultrasonics into the body of water at a predetermined timing, a transmitter/receiver is provided for supplying data relating to the ultrasonics which have been transmitted through the body of water and received by the second transducer array, to the ray tracer. Further, a beam transmitting direction controller is provided for shifting the phase of a signal relating to each of the transducers constituting the first transducer array so that the beam direction $\theta$ on the first plane, of the first transducer array is changed within a predetermined angular range. Also, a receiving beam direction controller is provided for shifting the phase of a signal corresponding to each of the transducers constituting the second transducer array, so that the beam direction $\phi$ on the second plane, of the second transducer array is repeatedly changed within a predetermined angular range during a short period when a changing amount of the beam direction $\theta$ and a propagation distance of the ultrasonics remain within a predetermined value. As described above, when the first and second transducer arrays are used for transmission and receiving, respectively, and phase shifts for the transmitting and reception signals are desirably controlled, it is possible to two-dimensionally scan the area underwater, similar to a case in which an 2D transducer array for two-dimensionally steering a narrow beam is used. Moreover, when the beam is formed in a fan-like shape (a fan beam) on a plane which crosses the transducer arrangement direction, the 3D area of scanning can be enhanced. Further, the number of transducers (and associated phase shifters) can be reduced as a whole, which makes it possible to reduce the device size.

When the first transducer array is used not only for transmission but also for receiving such that the received outputs of the first and second transducer arrays are combined (e.g., to obtain a product of the outputs), resultant reception data with much narrower reception width is supplied to the ray tracer. With this arrangement, the width of a beam formed by the first transducer array can be narrower than that in the case where the first transducer array is exclusively used for transmission. This consequently renders the device less affected by noises (e.g., acoustic waves from anything other than a fish shoal) and improves resolution. This arrangement can be achieved without increasing transducer size.

A ray tracer in this invention can be realized as a means for controlling or operating a write address for use in writing reception data into a 2D memory space (e.g., an image memory) which corresponds to a display screen. That is, when reception data obtained from a scanner is written into a 2D memory space corresponding to a display screen, the memory address with respect to the memory space is controlled such that the reception data relating to the space is written into the memory space in the form of 2D data representative of an image similar to the image that would be seen when viewing the space under the water surface from a hypothetical viewing point. The display shows, on its screen, an image indicating the presence or absence, concentration, and size of any schools of fish, based on the data stored in the memory space. As described above, a ray tracer for projecting reception data expressed in conformity to a 3D polar coordinate system on a 2D screen can be realized by using a relatively simple method, such as write address operation. Note that although a radar device, or the like, for PPI (Plan Position Indicator) display on a raster-scan display screen has conventionally employed write address operation for coordinate conversion, this coordinate conversion, i.e., scan conversion, differs completely from the ray tracing in the present invention, as the former is a conversion either from a 2D polar coordinate system to a 2D orthogonal coordinate system (in a marine radar, or the like) or from a 3D polar coordinate system to a 2D orthogonal coordinate system (in a weather radar, or the like). Also, in the field of 3D graphics or the like, ray tracing has conventionally been applied for displaying information concerning a 3D object on a 2D screen. This ray tracing, however, also differs from that in the present invention in terms of a coordinate system in conformity to which an object is expressed and the nature of the object data. Specifically, the object for ray tracing in the former is artificial data expressed in conformity to a 3D orthogonal coordinate system while that in the latter is search/measurement data expressed in conformity to a 3D polar coordinate system.

When writing data into the above mentioned memory space, preferably, a perspective relationship between respective positions in the scanned area observed from a hypothetical viewing point is determined. For example, when position relating to the data to be written into the memory space exists in the same direction when viewed from the hypothetical viewing point as that in which a position relating to the data having been written in the memory space exists, data writing to the memory space is prohibited so that the data having been written in the memory space can be preserved without being overwritten or lost. Alternatively, even under conditions in which data writing should normally be prohibited, such as is described above, if the position relating to the data to be written is closer to the hypothetical viewpoint than the position relating to the data having been written in the memory space, data writing may be allowed so that the perspective relationship between the positions when viewed from the hypothetical viewing point is established and maintained. As still another alternative, when the position relating to the data to be written into the memory space exists in the same direction when viewed from the hypothetical viewing point as that in which a position relating to the data having been written in the memory space exists, the data to be written can be arithmetically combined with the data having been written in the memory space, so that the resultant data is written at the address relating to the data having been written in the memory space. With this arrangement, various other data processing, such as integration of reception data along the extending from the hypothetical viewing point, i.e., a hypothetical ray, can be realized.

Further, the position of the above hypothetical viewing point may be changed in response to a user instruction. In this case, preferably, a data bank is provided for storing reception data obtained by using the scanner. That is, when the user instructs a change in the position of the hypothetical viewing point, the content of the memory space necessary for the display is updated while supplementing data lacking in the memory space with the data stored in the data bank so that the image displayed on the display screen can rotate according to the instruction. This can prevent a problem such that an image is displayed with partial defection when the user changes the hypothetical viewing point.

Still further, the motion of a ship may be detected by using a gyro, a log, the GPS (Global Positioning System), or the like, and the obtained information (a moving speed, a moved distance, an inclination, or the like) is reflected, as the movement of the origin of the polar coordinate system relating to the reception data obtained by using the scanner, in the ray tracing processing. This can make it less likely that the displayed image for fish finding is disturbed due to the motion of the ship.

Yet further, when the hypothetical viewing point from which the scanning object space is hypothetically observed, is set above the surface of the water, it is possible to display, on a display screen, an image which will be projected onto the water surface when viewing beneath the water surface from aboard the ship, or an image what would be obtained by cross-sectioning the scanning object space with a desired plane. For example, when the hypothetical viewing point is positioned on a line vertical to the water surface, it is possible to display, on the display screen, a water-surface-projected image which will be seen when viewing directly below the water surface from aboard the ship, or a cross-sectional view relating to a horizontal plane at a desired water depth. This enables close matching of user demands.

It should be noted that the present invention can be used to search for any object present in water, and not only fish, and to display of attribute information thereof. The present invention can thus be understood as relating to an apparatus for searching for an underwater object. An object to be searched may include a single or a group of living creatures, a sunken ship, the floor of a body of water, underwater construction, or the like. The attribute information may include the size, shape, concentration, or any relevant information about the object.

BRIEF DESCRIPTION OF THE DRAWINGS

The above and other objects, features, and advantages of the present invention, will become further apparent from the following description of the preferred embodiments taken in conjunction with the accompanying drawings wherein.

DESCRIPTION OF THE PREFERRED EMBODIMENTS

In the following, preferred embodiments of the present invention will be described based on the accompanying drawings. Descriptions and drawings for the parts common to respective embodiments will not necessarily be repeated.

(1) Arrangement and Directivity of Transducer Array

Figure 1:
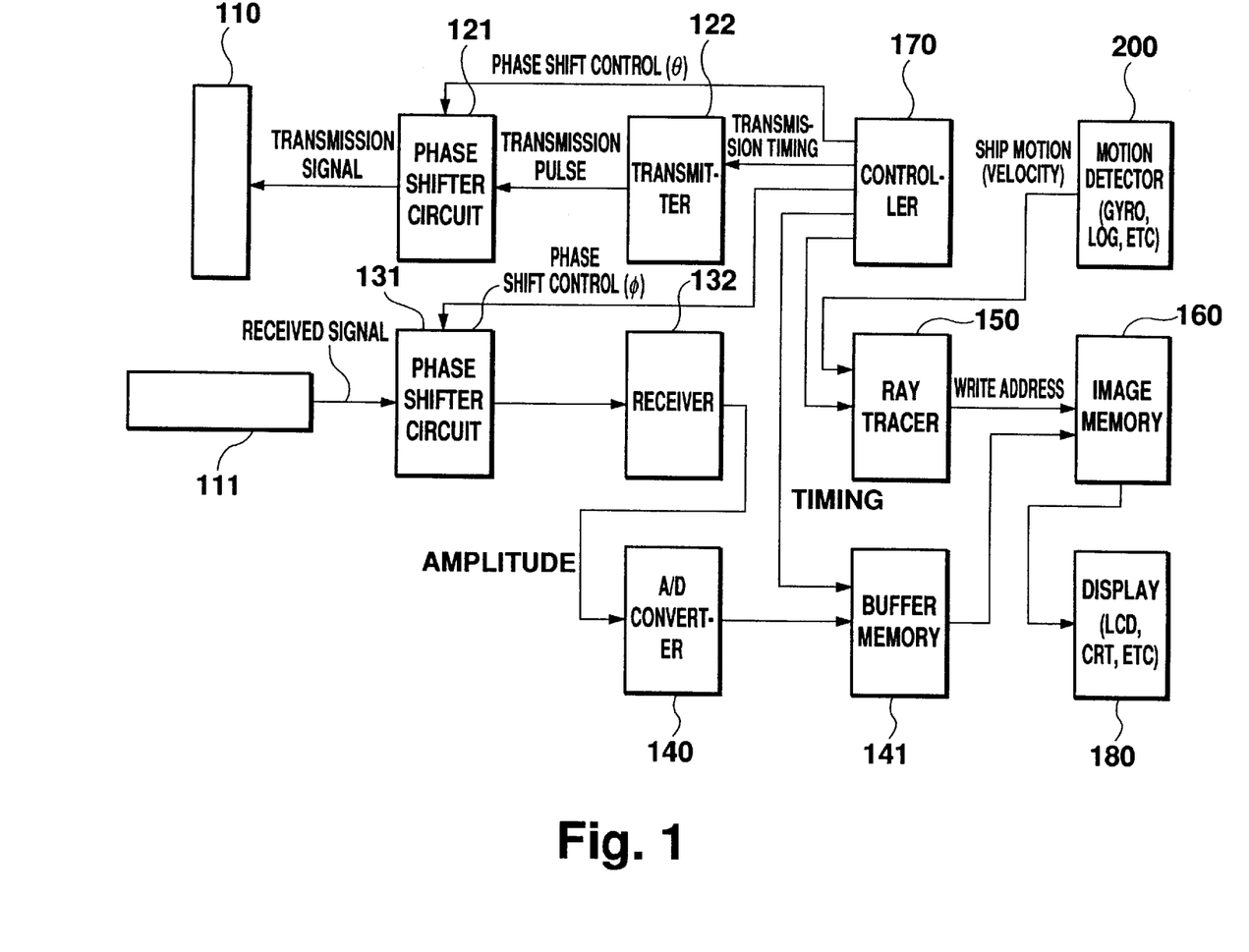
FIG. 1 is a block diagram showing a structure of a fish finder according to a first preferred embodiment of the present invention.
Figure 2:
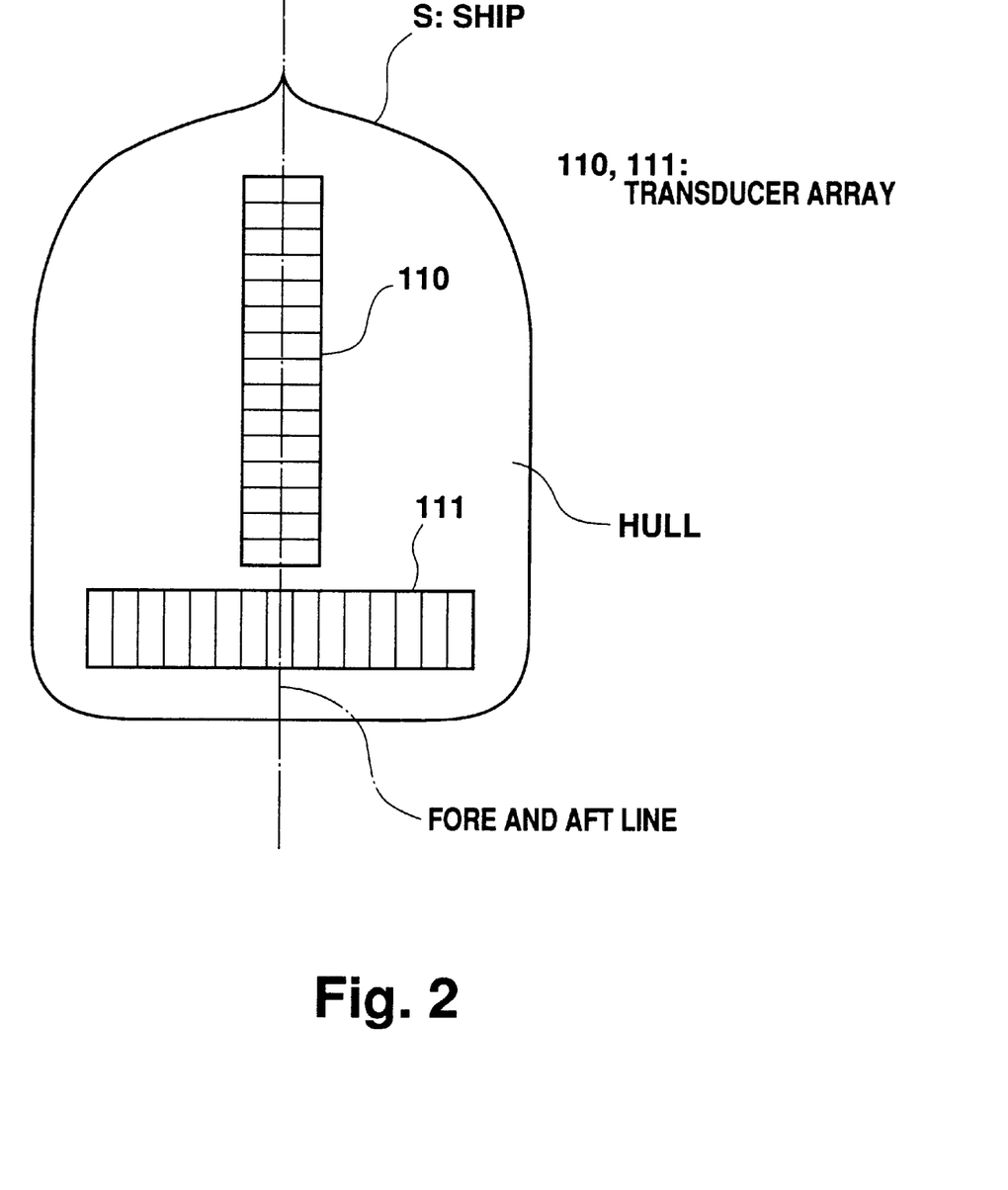
FIG. 2 is a diagram showing transducer arrays arranged on a ship's hull according to the first preferred embodiment.

FIG. 1 shows a structure of a fish finder according to a first preferred embodiment of the present invention. In this embodiment, transducer arrays 110, 111 are used for transmission and reception of ultrasonics, respectively. The transducer array 110 is fixedly arranged on the bottom of a ship S carrying the fish finder such that the transducer arrangement direction thereof is parallel to the fore and aft line of the ship S. The transducer array 111 is fixedly arranged on the ship's hull such that the transducer arrangement direction thereof is perpendicular to the keel line. That is, the transducer arrays 110, 111 constitute a pair of 1D transducer arrays fixedly attached to the bottom of the ship S such that directions of transducer arrays thereof, generally, intersect with each other, specifically, at a right angle.

Figure 3A:
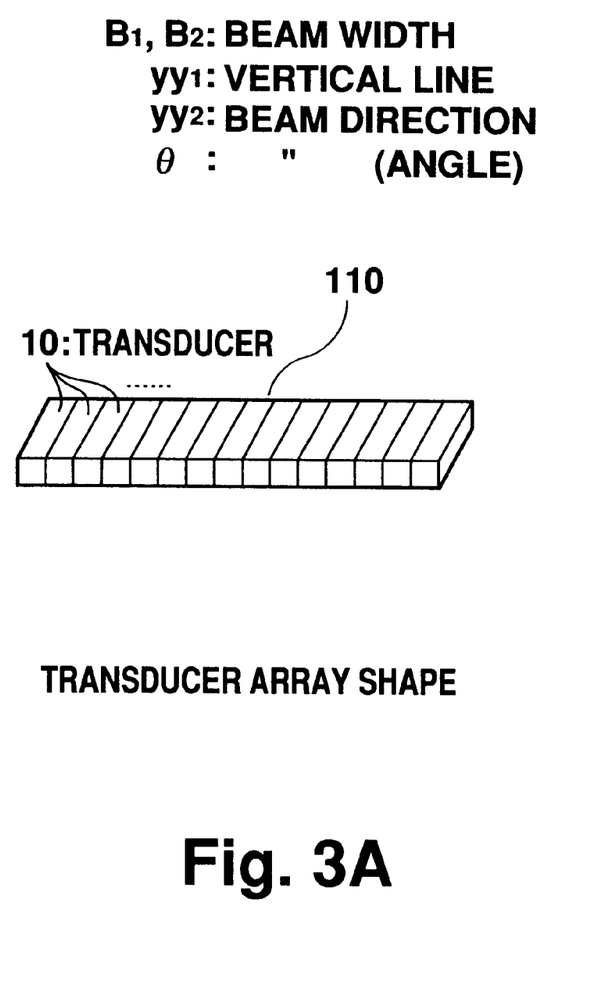
FIG. 3A is a perspective view showing a transducer arrangement for a transducer array for use in the first preferred embodiment.

A 1D transducer array to be used as a transducer array 110 or a transducer array 111 is a transducer array whose beam has a fan-like shape on a plane which crosses the transducer arrangement direction thereof. As shown in FIG. 3A exemplifying the transducer array 110, a 1D transducer array comprises a plurality of transducers 10 arranged in a predetermined direction, in which the beam width $B_1$ on a plane parallel to the transducer arrangement direction is narrow, as shown in FIG. 3B, and the width $B_2$ on a plane perpendicular to the transducer arrangement direction is broad, as shown in FIG. 3C.

Figure 3B:
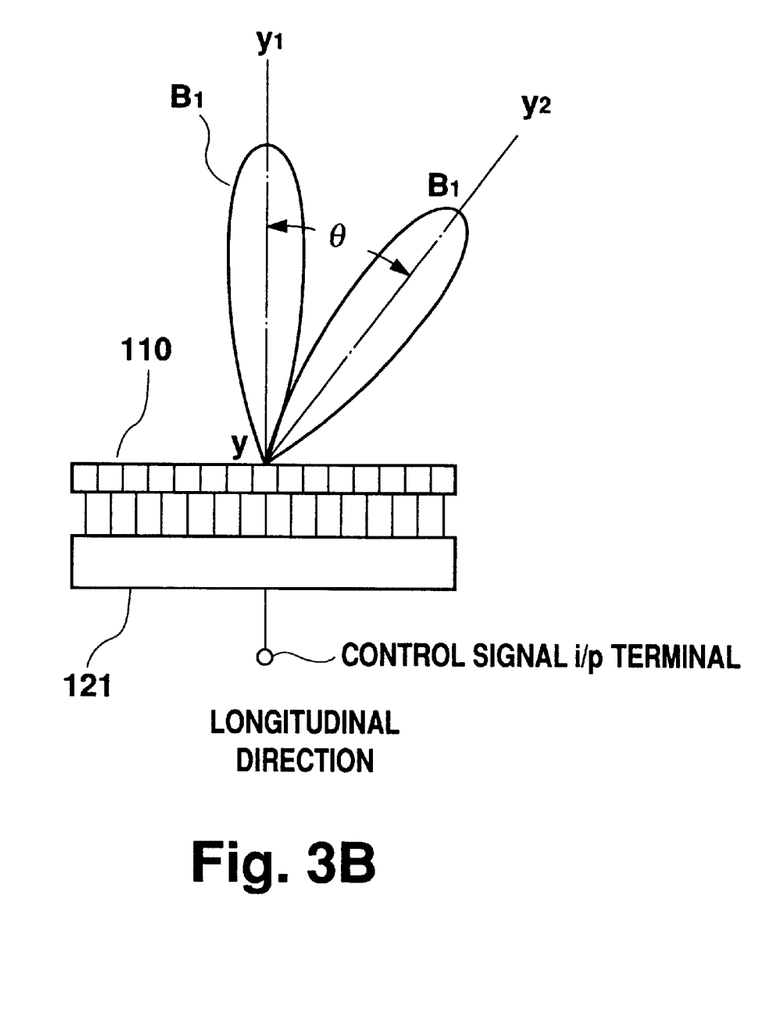
FIG. 3B is a conceptual diagram showing the shape of a beam on a plane parallel to the direction in which a transducer is arranged and a structure for controlling the direction of the beam.
Figure 3C:
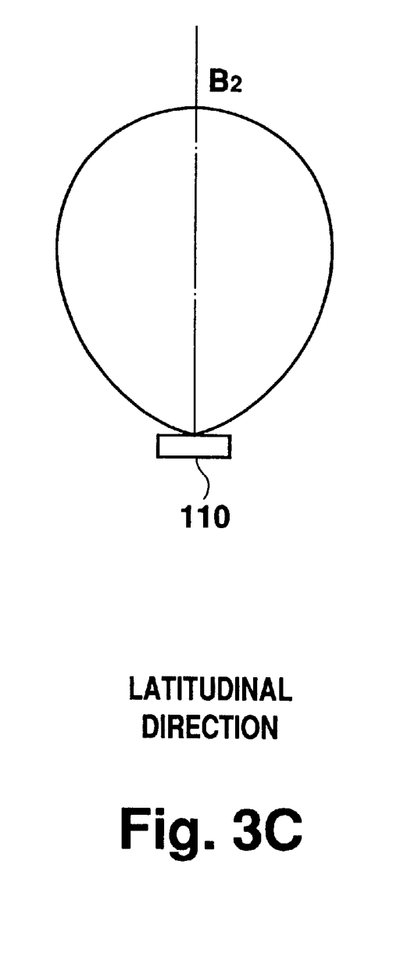
FIG. 3C is a conceptual diagram showing the shape and arrangement of the beam on a plane perpendicular to the transducer arrangement direction.

Further, as shown in FIG. 3B, the beam direction of the transducer array 110 on a plane parallel to the transducer arrangement direction is not fixed in the direction $yy_1$ which is vertical to the ship's hull, and can be varied, e.g., in the direction $yy_2$ shown in the drawing. A phase shifter circuit 121 is provided to change the angle formed by the direction $yy_2$ with respect to the direction $yy_1$, or θ, (hereinafter referred to also as "a beam direction θ"), as shown in FIG. 1, comprising a plurality of phase shifters (not shown) and a combiner/distributor (not shown).

In response to a control signal externally supplied, each phase shifter shifts the phase of a signal outputted from the associated transducer of all the transducers constituting the transducer array 110. For example, phase-shifts are determined such that the shifter associated with the transducer 10 arranged at one end of the transducer array 110 may shift a signal phase by a larger amount, the shifter associated with the transducer 10 arranged at the other end may shift by a smaller amount, and other shifters may shift by an amount determined through proportional division according to the positions of the associated transducers 10 in the transducer array. Note that the present invention can be implemented by using various methods for controlling a phase shift amount which has been conventionally employed in a 1D transducer array, and is not restricted to a particular method. The combiner/distributor distributes signals externally supplied to the phase shifter circuit 121, to each transducer 10 through the associated shifter.

Also, preferably, the beam direction θ is controlled within a range of, for example, +/−60 (deg). Further, a phase shifter circuit 131 is provided, corresponding to the transducer array 111, for variable control of the beam direction φ on a plane parallel to the transducer arrangement direction of the transducer array 111. The operation of the phase shifter circuit 131 is substantially the same as that of the phase shifter circuit 121 (except in that the phase shifter circuit 131 combiner/distributer combines reception signals instead of distributing transmitting signals), and thus is not explained here.

(2) Scanning Method

Figure 4:
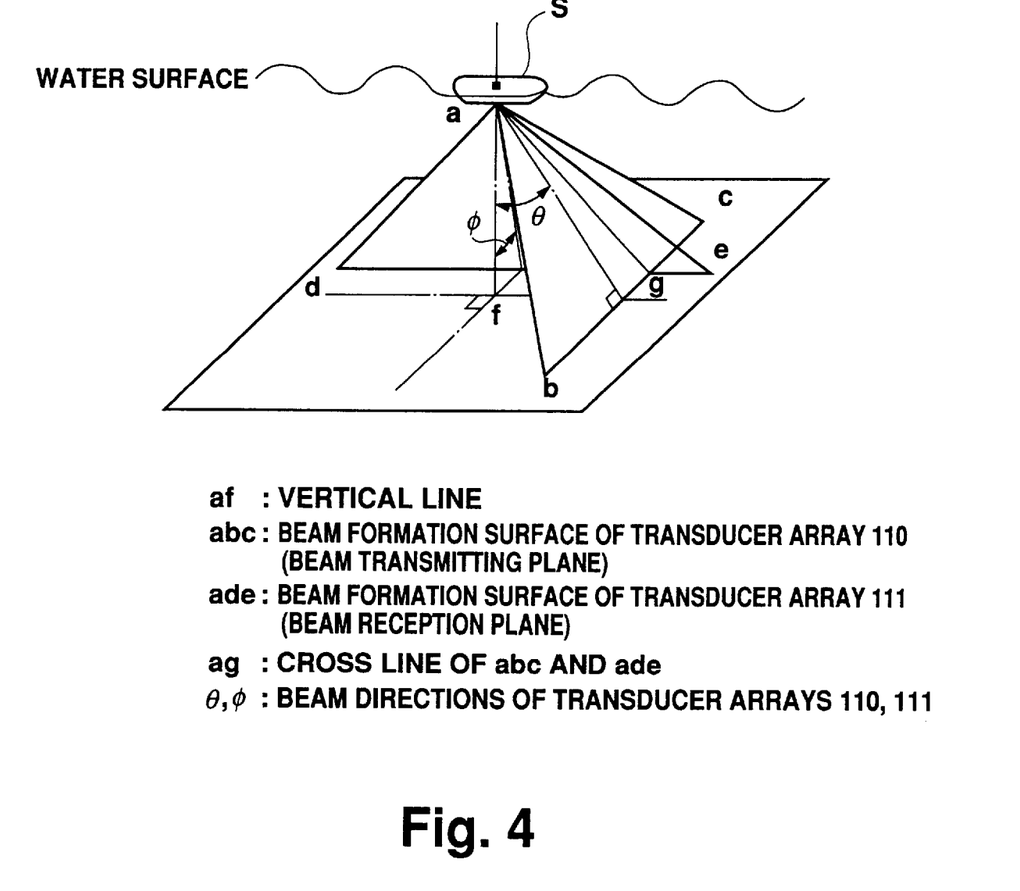
FIGS. 4 and 5 are conceptual diagrams relating to a method for scanning the space under the water surface in the first preferred embodiment.
Figure 5:
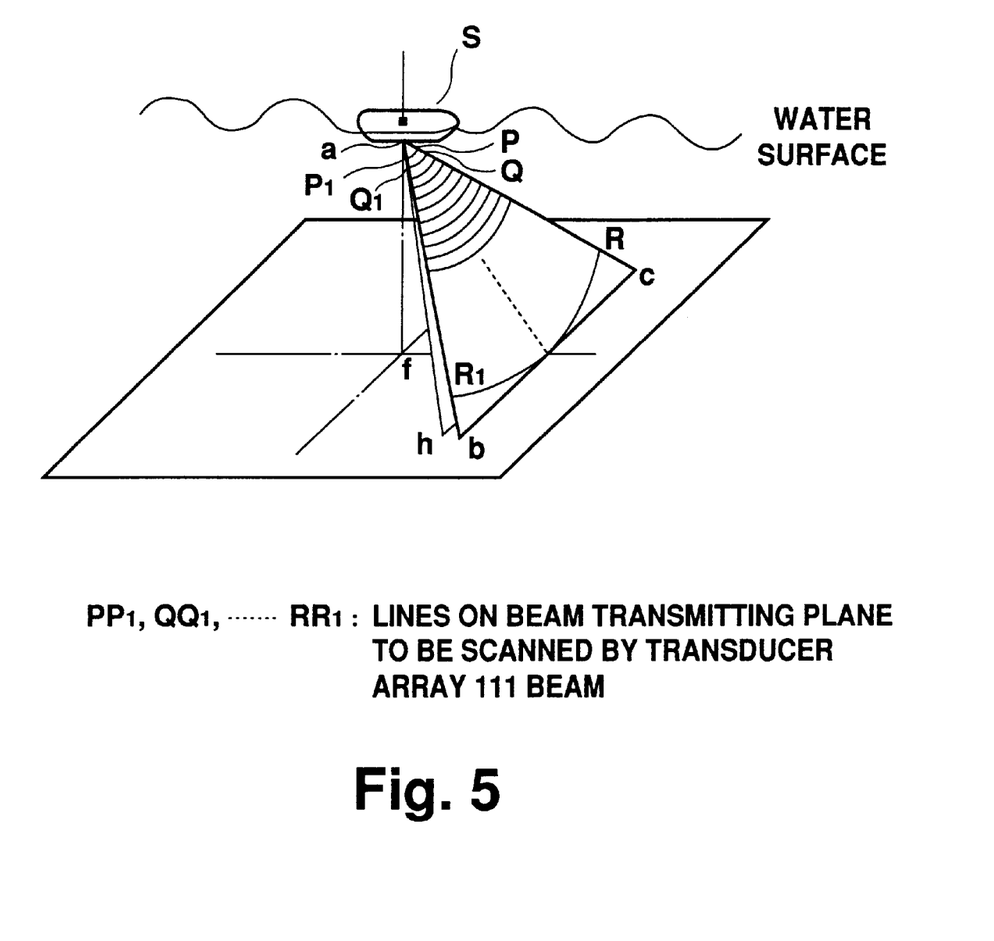

In this embodiment, a 3D underwater area in a region where a ship S operates is scanned while following the procedure outlined in FIGS. 4 and 5 so as to detect the presence or absence of any schools of fish, if found, their concentration and size.

Referring to FIG. 4, the letter "a" represents a ship's hull, the letter "f" designates a point vertically below the ship's hull, and the line af designates a line extending from the ship S vertically below into the water. As described above, the beam widths of the transducer arrays 110, 111 are narrow on a plane parallel to the transducer arrangement directions thereof, and broad, having a fan shape, on a plane perpendicular to the directions. Referring to FIG. 4, the fan-shaped beam (a fan beam) associated with the transducer array 110 belongs to the plane represented as "abc", or a beam transmitting plane, and that with the transducer array 111 belongs to the plane "ade", or a beam receiving plane. The ultrasonics transmitted by the transducer array 110 into the body of water will propagate substantially along the plane abc, and will be reflected by any obstacle, such as any schools of fish, existing on the plane abc. The transducer array 111 on the receiver side receives, with a relatively high gain, the ultrasonics that have successfully traveled along the plane ade in the body of water. That is, of the ultrasonics having been transmitted by the transducer array 110 into the body of water and reflected by any obstacle therein, the transducer array 111 receives mainly those reflected by an obstacle present on a line ag along which the planes abc, ade contact each other. This enables to substantially achieve a beam width at least narrower than that which is achieved in the related art in which ultrasonic transmission/reception is made by using a transducer having a narrow beam.

The plane abc and the vertical line af form an angle equivalent to the beam direction θ, and the plane ade and the vertical line af form an angle equivalent to the beam direction φ. In this embodiment, the beam direction θ is changed at a relatively slow speed, while the beam direction φ is changed at a relatively high speed. Specifically, after the beam direction θ is set at a desired value, the transducer array 110 transmits ultrasonics, and the beam direction φ of the transducer array 111 is repeatedly changed, while maintaining substantially the same beam direction θ, at a high speed from the direction of the straight line ac to that of the straight line ab. Then, after changing the beam direction θ by a minute angle and transmitting ultrasonics from the transducer array 110, the same operation as the above, particularly, repetitive changing of the beam direction φ of the transducer array 111 at a high speed, is applied. Then, the whole process will be thereafter repeated while the beam direction θ is changed within the control range.

Since the propagation velocity speed of the ultrasonics transmitted from the transducer array 110 is finite, when the beam direction φ is changed from the straight line ac to the straight line ab in a cycle sufficiently shorter than the cycle in which the beam direction θ is changed, presence or absence of a fish shoal under the water surface can be detected in the order of at the position P→$P_1$, the position Q→$Q_1$, . . . the position R→$R_1$, along the curved lines shown in FIG. 5 while the beam direction θ remains at a desired value. Note that the curved lines connecting the positions P and $P_1$, the positions Q and $Q_1$, . . . the positions R and $R_1$, respectively, can be treated as concentric arcs with the center of the ship's hull used as the origin. However, the curved lines are not arcs sensu stricto because ultrasonics propagate even while the beam direction φ is being changed from the straight line ac side to the straight line ab side. After the beam direction θ is changed, the above operation will be repeated.

As described above, when two (generally speaking, a plurality of) 1D transducer arrays are fixedly attached to the ship's hull such that the transducer arrangement directions thereof cross each other and one is used exclusively for transmission and the other for reception, it is possible to receive various information concerning a 3D space below the water surface in the form of ultrasonics without moving the ship S. Note that, although the present invention can be achieved by using a 2D transducer array which scans a 3D space by using a narrow beam in a 2D manner, the use of a 1D transducer array in the manner described above enables simplification and reduction of the device size.

Referring to FIG. 1, a 3D scanning operation described above involves the transducer arrays 110, 111, the phase shifter circuits 121, 131, the transmitter 122, the receiver 132, and the controller 170. Specifically, the controller 170, comprising one or more processors and peripheral circuits, instructs the transmitter 122 to generate a transmitting pulse at a predetermined cycle. In response to the instruction, the transmitter 122 cyclically generates transmitting pulses to supply via the phase shifter circuit 121 to the transducer array 110. Excited by the transmitting pulse, the transducer array 110 transmits ultrasonics under the water surface. The transducer array 111, on the other hand, receives ultrasonics having arrived through the body of water, and converts the received ultrasonics into an electric signal to supply via the phase shifter circuit 131 to the receiver 132. The receiver 132 detects and decodes the reception signal to thereby detect the amplitude thereof. The controller 170 controls the phase shifts for the respective phase shifters constituting the phase shifters 121, 131 in synchronism with the generation of a transmitting pulse in the transmitter 122. With the above arrangement, 3D scanning as shown in FIGS. 4 and 5 is achieved.

Note that a control signal for controlling the phase shifts may be supplied from the controller 170 to the phase shifter circuits 121, 131, or an instruction regarding the beam direction θ or φ may be supplied from the controller 170 to the phase shifter circuits 121, 131 so that the shifter circuits 121, 131 convert the instruction into a control signal concerning phase shifts. Also, the beam directions θ and φ may be changed stepwisely by a minute angle, or may be continuously changed.

(3) Ray Tracing

Generally, when an amplitude of received ultrasonics detected by a receiver 132 in connection with a certain point under the water surface is at a predetermined or more level, it can be determined that there is any not negligible reflecting object, such as a schools of fish, at that point. Also, as is obvious from FIGS. 4 and 5, the amplitude detected by the receiver 132 is expressed in conformity to a 3D polar coordinate with the ship's hull a used as the origin. Amplitude information describing the presence or absence, concentration, and size of a school of fish in conformity to a 3D polar coordinates is converted in the A/D converter 140 from an analog signal to a digital signal, and stored in a buffer memory 141 under timing control by the controller 170. Preferably, the buffer memory 141 has a capacity capable of storing data corresponding to one arc-like curved line (line P–$P_1$, and so on, in FIG. 5).

Data stored in the buffer memory 141 is written into an image display 160, which is a memory for providing a 2D memory space corresponding to the screen of a display 180. The display 180, achieved with a raster scan-type device, such as a CRT, an LCD, displays an image based on the data stored in the image memory 160. For example, if the data stored in the image memory 160 shows a large amplitude, a red image is displayed. Similarly, for data showing a smaller amplitude, and for data showing a much smaller amplitude, a yellow and blue images will be shown respectively. In other words, images will be displayed according to the amplitude, i.e., the magnitude of the fish shoal concentration.

A write address for use in writing the data temporarily stored in the buffer memory 141 into the image memory 160 is generated by the ray tracer 150 under control by the controller 170. Then, with operation of a write address, 3D data for a 3D polar coordinate system can be converted into 2D data agreeable to the screen of the display 180. This is referred to as a ray tracing in this application.

Figure 6:
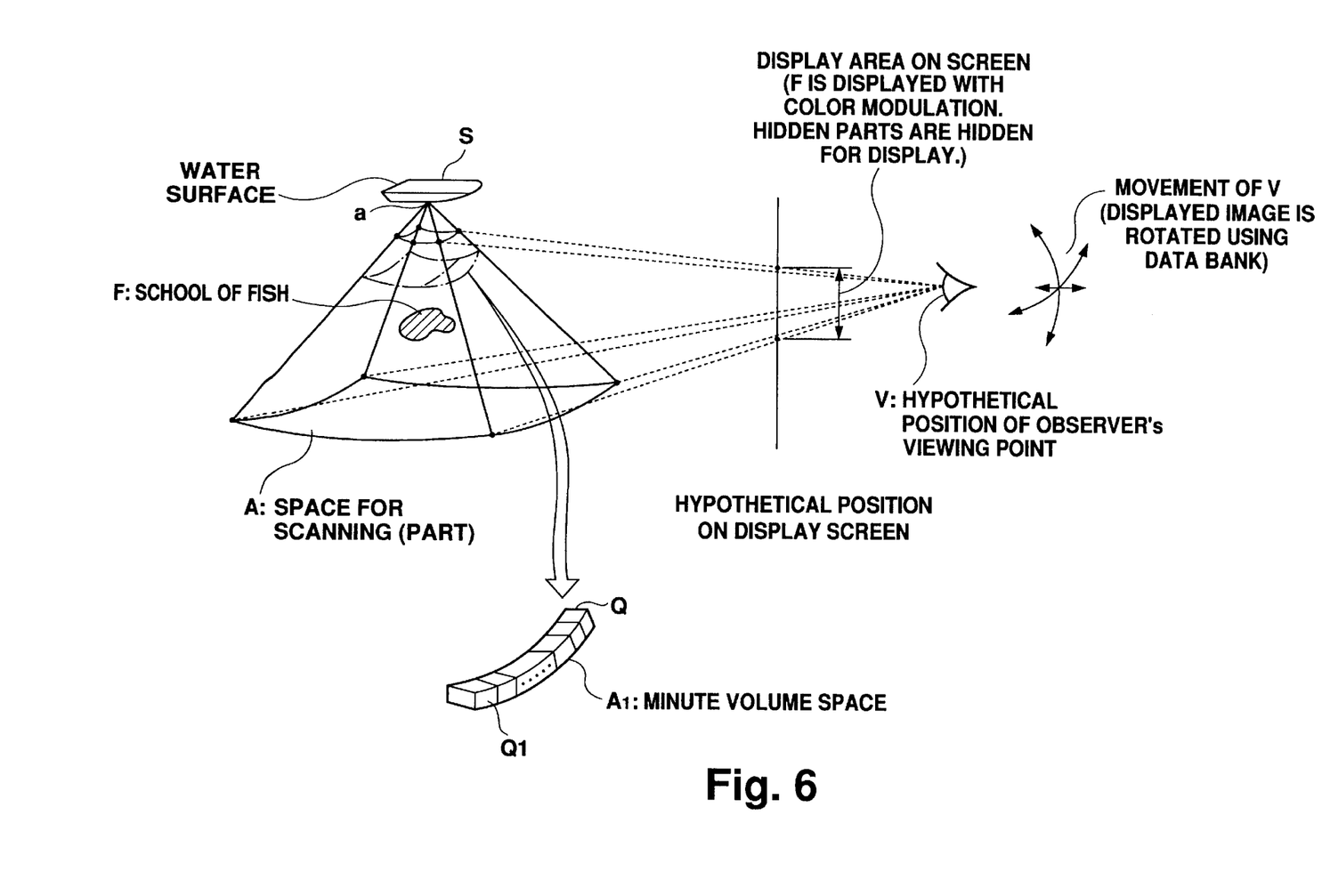
FIG. 6 is a conceptual diagram relating to a method for ray tracing in the first preferred embodiment.

FIG. 6 conceptually illustrates the content of ray tracing processing. Referring to the upper left of the drawing, a 3D space A (or a part thereof) to be scanned by a fish finder is shown (more specifically, transducer arrays 110, 111) according to this embodiment, which is equipped to the ship's hull a of the ship S. Reception signals obtained through scanning the space A can be recognized as a collection of minute volume spaces $A_1$ as is shown at the lower left part of the drawing as they are digitized by the A/D converter 140. Each minute volume space $A_1$ is defined by two substantially arc pieces with the ship's hull a used as the center (Q, $Q_1$ in the drawing). That is, the data which is temporarily stored in the buffer memory 141 at a certain time is data relating to a plurality of minute volume spaces $A_1$ arranged along the same concentric ark-like curved line Q–$Q_1$, i.e., discrete data in conformity to a 3D polar coordinate system.

Referring to the right side of the drawing, the relationship relative to the space A, of the hypothetical position of the screen of the display 180 and of the hypothetical position V of the observer's viewpoint is illustrated. Note that the term "an observer" is used here, meaning that a user assumed for ray tracing processing=a hypothetical person viewing the screen. As is shown in the drawing, in ray tracing processing, it is assumed that the hypothetical screen of the display 180 is positioned between the space A and the hypothetical position V of the observer's viewpoint.

If the information which would be displayed, i.e., projected, on the hypothetical screen when the scanning space A is observed from the position V, can be displayed on the actual screen of the display 180, the actual user can see, in the form of a solid image, the condition of the space A (such as the presence or absence of a fish shoal) viewed from the hypothetical position V. A ray tracing processing in this embodiment is processing for converting data which is a collection of data items concerning minute volume spaces $A_1$ and expressed in conformity to a 3D polar coordinate system into an image projected on a 2D hypothetical screen so that the condition in the scanning space A is three-dimensionally displayed on the actual 2D screen of the display 180.

As described above, in this embodiment, the information concerning a scanning space A present below the water surface can be displayed on a 2D screen as an image having a 3D expansion and depth even through the reception signals are expressed basically in conformity to a 3D polar coordinate system (i.e., a coordinate system which cannot be handled in ray tracing processing which has conventionally been used in other technical fields). This enables achieving a highly usable device for users. Further, according to the present invention, information concerning the ship motion, such as the speed or a moving distance per a unit time or the inclination of the ship S equipped with the fish finder of this invention, is detected by using a motion detector 200 including a GPS, a gyro, a log, or other similar devices, and inputted, so that the information is used as the movement of the ship's hull a, i.e., the movement of the origin of the scanning space A, in ray tracing processing. Specifically, the origin information for use in ray tracing processing is corrected, or read from the image memory 160 is controlled so that images can be scrolled on the screen of the display 180. Therefore, disturbance of images displayed on the screen of the display 180 may be reduced even when the ship S moves.

Further, in the present invention, if a request is made, in the course of scanning the space A, to write data at an address on the image memory 160 where different data has already been written, the ray tracer 150 prohibits the writing at that address to thereby prevent the written data from being overwritten and lost. With this arrangement, it is possible to display the initially obtained data of all the obtained data concerning a plurality of positions in the same direction viewed from the position V. Also, when depth information (a distance from the position V to the corresponding minute volume space $A_1$) for each data item stored in the image memory 160 is held in either the ray tracer 150 or the image memory 160, other processing can be made using the stored data. For example, if a request is made, in the course of scanning the space A, to write at an address where different data has already been written, the ray tracer 150 detects whether or not the minute volume space $A_1$ relating to the data to be written at that address is farther or closer with respect to the position V than the minute volume space $A_1$ relating to the data having already been written at that address, and either prohibits or allows the writing at that address so that data relating to the closer minute volume space $A_1$ is left stored in the image memory 160. Note that in the case where data relating to the farther minute volume space $A_1$ shows a larger amplitude, the ray tracer 150 prohibits or allows the writing so that data for the farther space $A_1$ is left stored in the image memory 160. Alternatively, if a request is made, in the course of scanning the space A, to write data at an address where different data has already been written, the ray tracer 150 arithmetically combines the data to be written with the data having been written at that address (e.g., through weighted addition) to write the result at that address. This enables achieving integration of reception data amplitudes along the ray from the position V, and, as a consequence, to display images of fish school F modulated according to the concentration along the depth direction.

It should be noted that although a viewpoint V is positioned on the side to the space A in the example shown in FIG. 6, the viewpoint V may be located above the water surface. With the latter arrangement, images similar to an image to be projected onto the water surface when viewing under the water surface from aboard the ship, or a cross sectional image of the space A along a desired plane, can be displayed on the screen of the display 180. In particular, with a viewing point V positioned on a vertical line with respect to the water surface, images similar to the projected images on the water surface which can be seen when viewing the water surface directly below from aboard the ship, and or a cross-sectional image relating to a horizontal plane having a desired water depth, can be displayed on the screen of the display 180. That is, according to the present invention, it is possible to closely match user requests.

(4) Rotation Processing

Figure 7:
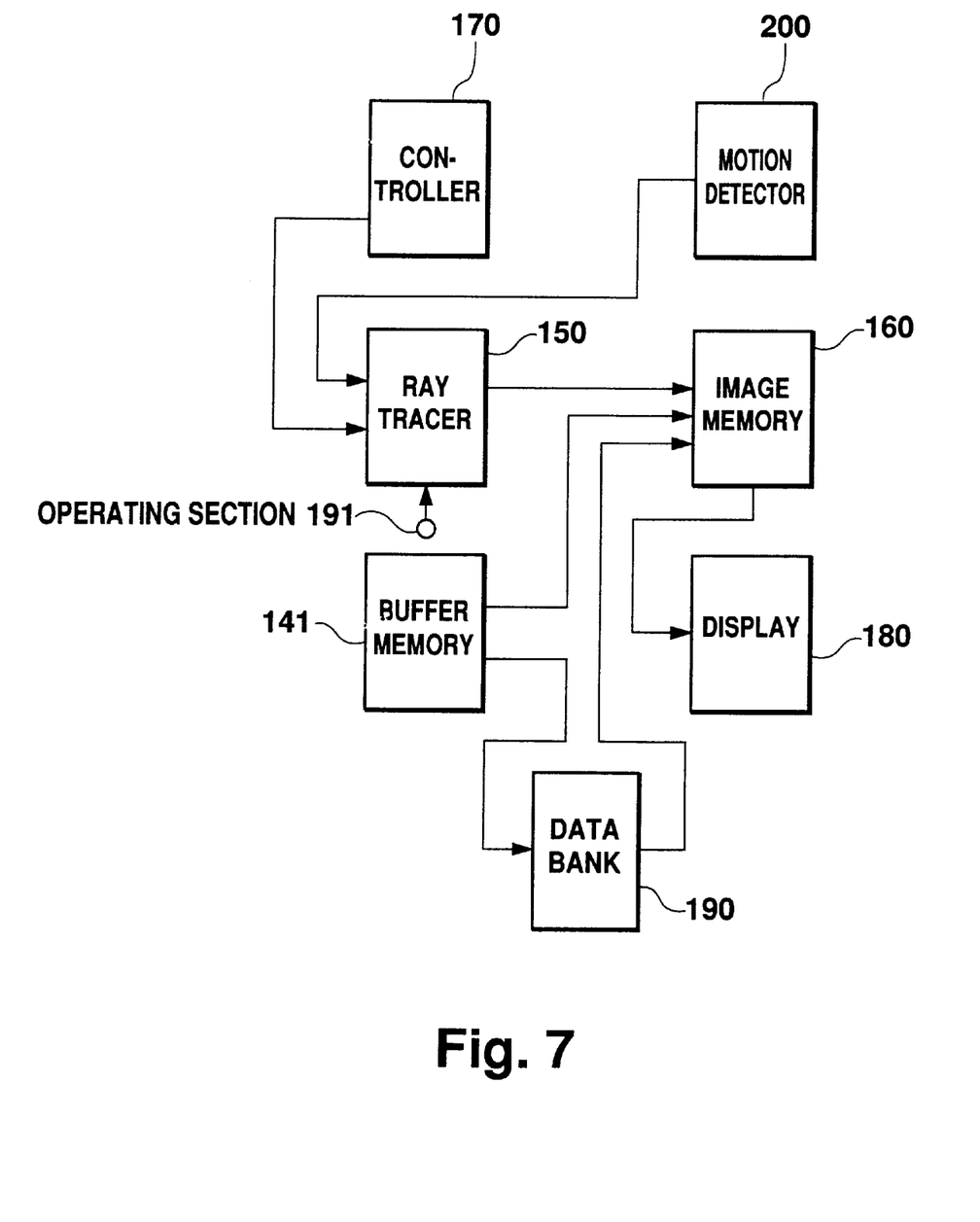
FIG. 7 is a block diagram showing major components of a fish finder according to a second preferred embodiment of the present invention.

FIG. 7 shows major elements of a fish finder according to a second preferred embodiment of the present invention. In this embodiment, a data bank 190 is provided for holding data which has been written in the buffer memory 141, during at least one scanning cycle (i.e., a period from the beginning to completion of one cycle of scanning the space A). The ray tracer 150 is connected to an operating section 191 for a user's operation, so that a user instructs the ray tracer via operating the operating section 191, to rotate, enlarge, or reduce a displayed image, i.e., to change the position V in FIG. 6. In response to such an instruction, the ray tracer 150 updates the contents of the image memory 160 and, as a consequence, images displayed on the screen of the display 180, by using the data stored in the data bank 190. For example, when an instruction is made to rotate the displayed image, data on a part which will be hidden by other parts as a result of rotating the displayed image is deleted from the data stored in the image memory 160, the data on a part which has been hidden and will appear as a result of the rotation is read from the data bank 190 to be written into the image memory 160, and data on other parts is given scrolling processing. With this arrangement, the user can desirably determine the viewing point position V to observe therefrom images of school of fish F from various angles.

(5) Transducer Arrays Commonly Used in Transmission and Reception

Figure 8:
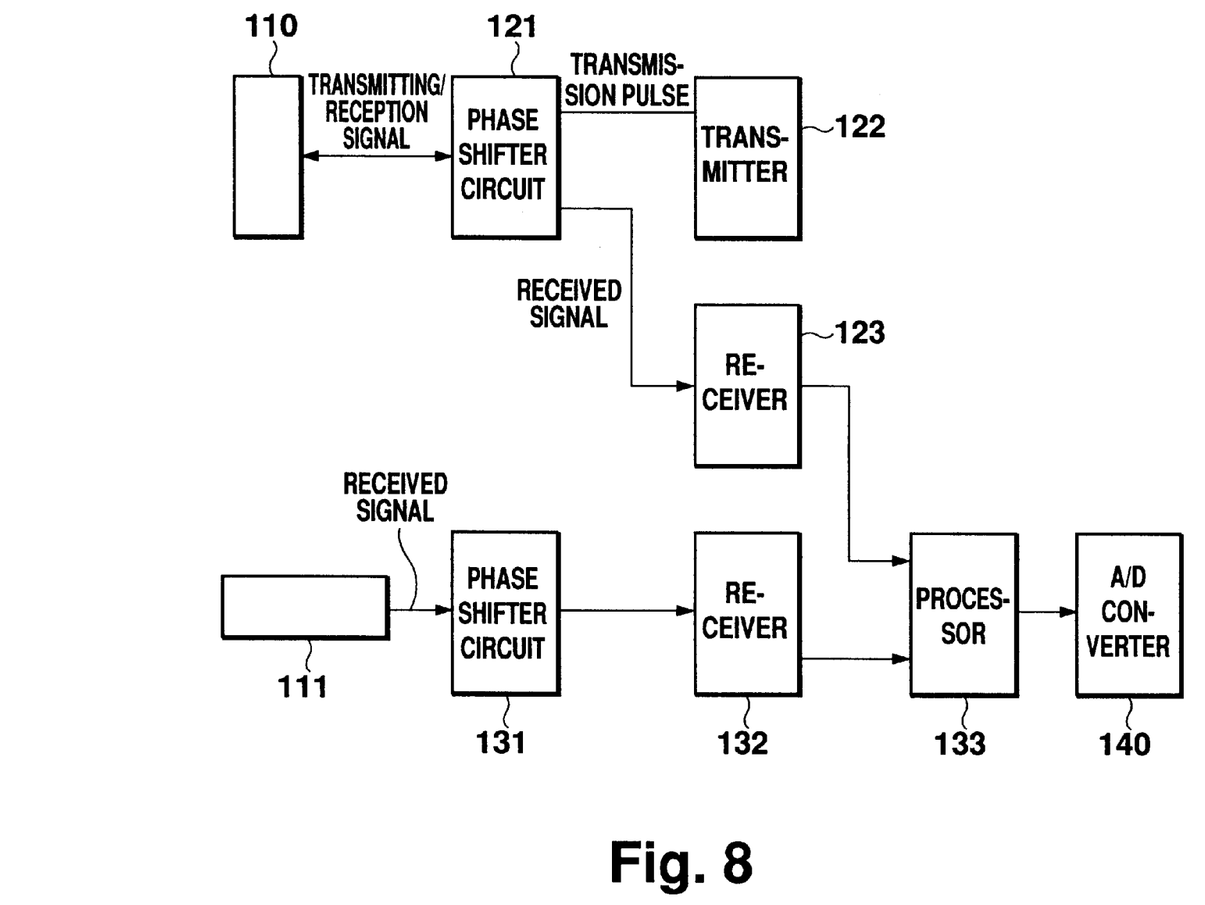
FIG. 8 is a block diagram showing major components of a fish finder according to a third preferred embodiment of the present invention.

FIG. 8 shows major elements of a fish finder according to a third preferred embodiment of the present invention. In this embodiment, the transducer array 110 is used not only for transmission but also for reception of ultrasonics. Further, a reception signal by the transducer array 110 is subjected to phase shifting in the phase shifter circuit 121 and detection and demodulation in the receiver 123, and supplied to the processor 133 together with an output from the receiver 132. The processor 133 calculates a product of the outputs from the receivers 123 and 132 to supply the result to the A/D converter 140.

Therefore, in this embodiment, it is possible to achieve a narrower reception beam width than that in the first and second embodiments. That is, since the combination of the directivity for transmission and the directivity for reception of the transducer array 110 results in a narrower beam width than the beam width $B_1$ in FIG. 3, combination between the resultant narrower beam width and a reception output of the transducer array 111 will result in a further narrower beam width. Specifically, noises from an acoustic source located on the plane ade and displaced from the line ag in FIG. 4, i.e., acoustic noises caused by its own engine or propeller, or sailing noises caused by other ships, may unlikely appear in the data to be outputted to the A/D converter 140. Further, a narrower reception beam width enables to achieve higher resolution. These advantages, namely noise prevention and improved resolution, can be achieved without enlarging the size of the transducers constituting the transducer arrays 110, 111, in other words, without a cost increase or sailing speed reduction. Alternatively, the processor 133 may be constructed to perform any processing other than multiplication only if the advantage of a narrow reception beam width is not impaired.

What is claimed is:

1. A fish finder, comprising:
    a scanner for scanning, with directive ultrasonics transmitted from a ship's hull, an underwater area to obtain reception data representative of presence or absence, concentration, and size of a school of fish in that area, the reception data being expressed in conformity to a 3D polar coordinate system with the ship's hull used as the origin;
    a ray tracer for conducting ray tracing processing on the reception data so that an image similar to an image which would be seen when viewing the area from a hypothetical viewing point, is displayed on a screen of a display; and
    the display displaying on a 2D screen thereof a 3D image representative of the presence or absence, concentration, and size of the school of fish in the area, based on the reception data subjected to the ray tracing processing.

2. A fish finder, comprising:
    a scanner for scanning, with directive ultrasonics transmitted from a ship's hull, an underwater area to obtain reception data representative of presence or absence, concentration, and size of a school of fish in that area, the reception data being expressed in conformity to a 3D polar coordinate system with the ship's hull used as the origin;
    a ray tracer for conducting ray tracing processing on the reception data so that an image similar to an image which would be seen when viewing the area from a hypothetical viewing point, is displayed on a screen of a display;
    the display displaying on a 2D screen thereof a 3D image representative of the presence or absence, concentration, and size of the school of fish in the area, based on the reception data subjected to the ray tracing processing, wherein the scanner includes:
        a first transducer array fixedly attached to the ship's hull, providing a beam whose direction $\theta$ on a first plane crossing the water surface is variable under control from outside, the beam having a fan shape on a second plane crossing the water surface and the first plane;
        a second transducer array fixedly attached to the ship's hull such that transducer arrangement direction thereof crosses a transducer arrangement direction of the first transducer array, providing a beam whose direction $\phi$ on the second plane is variable under control from outside, the beam a fan shape on the first plane;
        a transmitter/receiver for having the first transducer array transmit ultrasonics into the body of water at a predetermined timing, and for supplying data relating to ultrasonics having been transmitted through the body of water and received by the second transducer array, as the reception data to the ray tracer;
        a beam transmitting direction controller for shifting a phase of a signal relating to each of the transducers constituting the first transducer array to thereby change the direction $\theta$ within a predetermined angular range; and
        a beam receiving direction controller for shifting a phase of a signal relating to each of the transducers constituting the second transducers array to thereby repeatedly change the direction $\phi$ within a predetermined angular range during a short period in which a changing amount of the direction $\theta$ and a propagation distance of a ultrasonic wave remain within a predetermined minute value.

3. A fish finder according to claim 2, wherein the transmitter/receiver includes
    a controller for having the first transducer array transmit ultrasonics into the body of water at a predetermined timing, and
    a processor for combining a reception output of the first transducer array and a reception output of the second transducer array in a manner of achieving a narrower reception beam width to generate the reception data to be supplied to the ray tracer,
    whereby the first transducer array transmits and receives the ultrasonic waves.

4. A fish finder, comprising:
    a scanner for scanning, with directive ultrasonics transmitted from a ship's hull, an underwater area to obtain reception data representative of presence or absence, concentration, and size of a school of fish in that area, the reception data being expressed in conformity to a 3D polar coordinate system with the ship's hull used as the origin;
    a ray tracer for conducting ray tracing processing on the reception data so that an image similar to an image which would be seen when viewing the area from a hypothetical viewing point, is displayed on a screen of a display, wherein the ray tracer writes the reception data obtain by using the scanner into a 2D memory space corresponding to a screen of the display and controls a writing address with respect to the memory space so that the reception data relating to the space is written into the memory space in a form of 2D data representative of an image similar to an image which would be seen when viewing the space from a hypothetical viewing point; and
    the display displaying on a 2D screen thereof a 3D image representative of the presence or absence, concentration, and size of the school of fish in the area, based on the reception data subjected to the ray tracing processing and on the data stored in the memory space.

5. A fish finder according to claim 4, wherein writing to the memory space is prohibited to prevent data having been written in the memory space from being overwritten and lost when a position relating to the data to be written into the memory space exists in a same direction, when viewing from the hypothetical viewing point, as that in which a position relating to the data having been written in the memory space exists.

6. A fish finder according to claim 5, wherein, even when a position relating to the data to be written into the memory space exists in a same direction, when viewing from the hypothetical viewing point, as that in which a position relating to the data having been written in the memory space exists, writing to the memory space is allowed in a case where the position relating to the data to be written into the memory space is closer to the hypothetical viewpoint than the position relating to the data having been written in the memory space.

7. A fish finder according to claim 4, wherein the data to be written into the memory space is arithmetically combined to data having been written in the memory space and resultant data is written at an address relating to the data having been written in the memory space when a position relating to the data to be written into the memory space exists in a same direction, when viewing from the hypothetical viewing point, as that in which a position relating to the data having been written in the memory space exists.

8. A fish finder according to claim 4, further comprising
a data bank for holding reception data obtained by using the scanner,
means, when a user instructs to change the hypothetical viewing point, for rotating an image displayed on the screen of the display in response to the instruction, and for correcting content of the memory space while supplementing data lacking in the memory space by using the data held in the data bank.

9. A fish finder according to claim 2, wherein
the ray tracer writes the reception data obtained by using the scanner into a 2D memory space corresponding to a screen of the display, and controls a writing address with respect to the memory space so that the reception data relating to the space is written into the memory space in a form of 2D data representative of an image similar to an image which would be seen when viewing the space from a hypothetical viewing point, and
the display displays, on a screen thereof, an image representative of presence or absence, concentration, and size of a school of fish based on the data stored in the memory space.

10. A fish finder according to claim 9, wherein writing to the memory space is prohibited to prevent data having been written in the memory space from being overwritten and lost when a position relating to the data to be written into the memory space exists in a same direction, when viewing from the hypothetical viewing point, as that in which a position relating to the data having been written in the memory space exists.

11. A fish finder according to claim 10, wherein, even when a position relating to the data to be written into the memory space exists in a same direction, when viewing from the hypothetical viewing point, as that in which a position relating to the data having been written in the memory space exists, writing to the memory space is allowed in a case where the position relating to the data to be written into the memory space is closer to the hypothetical viewpoint than the position relating to the data having been written in the memory space.

12. A fish finder according to claim 9, wherein the data to be written into the memory space is arithmetically combined to data having been written in the memory space and resultant data is written at an address relating to the data having been written in the memory space when a position relating to the data to be written into the memory space exists in a same direction, when viewing from the hypothetical viewing point, as that in which a position relating to the data having been written in the memory space exists.

13. A fish finder according to claim 9, further comprising
a data bank for holding reception data obtained by using the scanner,
means, when a user instructs to change the hypothetical viewing point, for rotating an image displayed on the screen of the display in response to the instruction, and for correcting content of the memory space while supplementing data lacking in the memory space by using the data held in the data bank.

14. A fish finder, comprising:
a scanner for scanning, with directive ultrasonics transmitted from a ship's hull, an underwater area to obtain reception data representative of presence or absence, concentration, and size of a school of fish in that area, the reception data being expressed in conformity to a 3D polar coordinate system with the ship's hull used as the origin;
a motion detector for detecting the motion of the ship; and
a ray tracer for conducing ray tracing processing on the reception data so that an image similar to an image which would be seen when viewing the area from a hypothetical viewing point, is displayed on a screen of a display, wherein the ray tracer reflects the motion detected in the ray tracing processing, as a motion of an origin of the 3D polar coordinate system relating to the reception data obtained by using the scanner; and
the display displaying on a 2D screen thereof a 3D image representative of the presence or absence, concentration, and size of the school of fish in the area, based on the reception data subjected to the ray tracing processing.

15. A fish finder, comprising:
a scanner for scanning, with directive ultrasonics transmitted from a ship's hull, an underwater area to obtain reception data representative of presence or absence, concentration, and size of a school of fish in that area, the reception data being expressed in conformity to a 3D polar coordinate system with the ship's hull used as the origin;
a ray tracer for conducting ray tracing processing on the reception data so that an image similar to an image which would be seen when viewing the area from a hypothetical viewing point, is displayed on a screen of a display; and
the display displaying on a 2D screen thereof a 3D image representative of the presence or absence, concentration, and size of the school of fish in the area, based on the reception data subjected to the ray tracing processing, wherein with an arrangement in which the hypothetical viewing point is set above the water surface, the ray tracer displays an image on the screen of the display, the image being obtained by cross-sectioning the space under the water surface with a desired plane, or being same as an image projected on the water surface when viewing under the water surface from aboard the ship.

16. A fish finder according to claim 15, wherein,
with an arrangement in which the hypothetical viewing point is set on a line vertical to the water surface, the ray tracer displays, on the screen of the display, a water surface projected image which would be seen when viewing the water surface directly below from aboard the ship, or an image similar to an image obtained by cross-sectioning the space with a horizontal plane having a desired water depth.

17. An apparatus for searching an object in water, comprising:
   a scanner for scanning, with directive ultrasonics transmitted from a ship's hull, an underwater area to obtain reception data including attribute information of the object in that area, the reception data being expressed in conformity to a 3D polar coordinate system with the ship's hull used as the origin;
   a ray tracer for conducting ray tracing processing on the reception data so that an image similar to an image which would be seen when viewing the area from a hypothetical viewing point, is displayed on a screen of a display; and
   the display displaying on a 2D screen thereof a 3D image representative of the attribute information of the object in the area, based on the reception data subjected to the ray tracing processing.

18. An apparatus for searching for an object in water, comprising:
   a scanner for scanning, with directive ultrasonics transmitted from a ship's hull, an underwater area to obtain reception data including attribute information of the object in that area, the reception data being expressed in conformity to a 3D polar coordinate system with the ship's hull used as the origin;
   a ray tracer for conducting ray tracing processing on the reception data so that an image similar to an image which would be seen when viewing the area from a hypothetical viewing point, is displayed on a screen of a display;
   the display displaying on a 2D screen thereof a 3D image representative of the attribute information of the object in the area, based on the reception data subjected to the ray tracing processing, wherein the scanner includes:
      a first transducer array fixedly attached to the ship's hull, providing a beam whose direction $\theta$ on a first plane crossing the water surface is variable under control from outside, the beam having a fan shape on a second plane crossing the water surface and the first plane;
      a second transducer array fixedly attached to the ship's hull such that transducer arrangement direction thereof crosses a transducer arrangement direction of the first transducer array, providing a beam whose direction $\phi$ on the second plane is variable under control from outside, the beam a fan shape on the first plane;
      a transmitter/receiver for having the first transducer array transmit ultrasonics into the body of water at a predetermined timing, and for supplying data relating to ultrasonics having been transmitted through the body of water and received by the second transducer array, as the reception data to the ray tracer;
      a beam transmitting direction controller for shifting a phase of a signal relating to each of the transducers constituting the first transducer array to thereby change the direction $\theta$ within a predetermined angular range; and
      a beam receiving direction controller for shifting a phase of a signal relating to each of the transducers constituting the second transducers array to thereby repeatedly change the direction $\phi$ within a predetermined angular range during a short period in which a changing amount of the direction $\theta$ and a propagation distance of a ultrasonic wave remain within a predetermined minute value.

19. An apparatus for searching for an object in water, comprising:
   a scanner for scanning, with directive ultrasonics transmitted from a ship's hull, an underwater area to obtain reception data including attribute information of the object in that area, the reception data being expressed in conformity to a 3D polar coordinate system with the ship's hull used as the origin;
   a ray tracer for conducting ray tracing processing on the reception data so that an image similar to an image which would be seen when viewing the area from a hypothetical viewing point, is displayed on a screen of a display, wherein the ray tracer writes the reception data obtain by using the scanner into a 2D memory space corresponding to a screen of the display and controls a writing address with respect to the memory space so that the reception data relating to the space is written into the memory space in a form of 2D data representative of an image similar to an image which would be seen when viewing the space from a hypothetical viewing point; and
   the display displaying on a 2D screen thereof a 3D image representative of the attribute information of the object in the area, based on the reception data subjected to the ray tracing processing and on the data stored in the memory space.

20. An apparatus for searching for an object in water, comprising:
   a scanner for scanning, with directive ultrasonics transmitted from a ship's hull, an underwater area to obtain reception data including attribute information of the object in that area, the reception data being expressed in conformity to a 3D polar coordinate system with the ship's hull used as the origin;
   a motion detector for detecting the motion of the ship;
   a ray tracer for conducting ray tracing processing on the reception data so that an image similar to an image which would be seen when viewing the area from a hypothetical viewing point, is displayed on a screen of a display, wherein the ray tracer reflects the motion detected in the ray tracing processing, as a motion of an origin of the 3D polar coordinate system relating to the reception data obtained by using the scanner; and
   the display displaying on a 2D screen thereof a 3D image representative of the attribute information of the object in the area, based on the reception data subjected to the ray tracing processing.

21. An apparatus for searching for an object in water, comprising:
   a scanner for scanning, with directive ultrasonics transmitted from a ship's hull, an underwater area to obtain reception data including attribute information of the object in that area, the reception data being expressed in conformity to a 3D polar coordinate system with the ship's hull used as the origin;
   a ray tracer for conducting ray tracing processing on the reception data so that an image similar to an image which would be seen when viewing the area from a hypothetical viewing point, is displayed on a screen of a display; and
   the display displaying on a 2D screen thereof a 3D image representative of the attribute information of the object in the area, based on the reception data subjected to the ray tracing processing, wherein with an arrangement in which the hypothetical viewing point is set above the water surface, the ray tracer displays an image on the screen of the display, the image being obtained by cross-sectioning the space under the water surface with a desired plane, or being same as an image projected on the water surface when viewing under the water surface from aboard the ship.

* * * * *